(12) United States Patent
Park

(10) Patent No.: US 7,492,189 B2
(45) Date of Patent: Feb. 17, 2009

(54) CURRENT MODE BUS INTERFACE SYSTEM, METHOD OF PERFORMING A MODE TRANSITION AND MODE CONTROL SIGNAL GENERATOR FOR THE SAME

(75) Inventor: Dong-Uk Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 400 days.

(21) Appl. No.: 11/357,550

(22) Filed: Feb. 17, 2006

(65) Prior Publication Data

US 2006/0230206 A1 Oct. 12, 2006

(30) Foreign Application Priority Data

Mar. 8, 2005 (KR) ...................... 10-2005-0019050

(51) Int. Cl.
 *H03K 19/0175* (2006.01)
(52) U.S. Cl. ........................... 326/82; 326/62; 327/108; 710/110
(58) Field of Classification Search .................. 326/62, 326/82–92; 327/100, 108–109; 710/110
 See application file for complete search history.

(56) References Cited

U.S. PATENT DOCUMENTS 6,009,487 A * 12/1999 Davis et al. ................. 710/105

FOREIGN PATENT DOCUMENTS

| JP | 2001-067157 | 3/2001 |
| KR | 10-20040003471 | 1/2004 |
| KR | 10-441230 | 7/2004 |

* cited by examiner

*Primary Examiner*—Clifford H Knoll
(74) *Attorney, Agent, or Firm*—F. Chau & Assoc., LLC

(57) ABSTRACT

A current mode bus interface system includes a host interface device configured to transmit a reference current and a clock current, and to transmit a data current during a first transfer mode, and to receive a reverse direction data current and compare the reverse direction data current with the reference current to generate a reverse direction data voltage during a second transfer mode; and a client interface device configured to receive the reference current and the clock current and compare the reference current with the clock current to generate a clock voltage, to receive the data current and compare the data current with the reference current to generate a data voltage during the first transfer mode, and to transmit the reverse direction data current through a conducting wire over which the data current is received during the second transfer mode.

24 Claims, 10 Drawing Sheets

CURRENT MODE BUS INTERFACE SYSTEM, METHOD OF PERFORMING A MODE TRANSITION AND MODE CONTROL SIGNAL GENERATOR FOR THE SAME

CROSS-REFERENCE TO RELATED APPLICATION

This application claims priority to Korean Patent Application No. 10-2005-0019050, filed on Mar. 8, 2005 in the Korean Intellectual Property Office, the disclosure of which is incorporated by reference herein in its entirety.

BACKGROUND OF THE INVENTION

1. Technical Field

The present invention relates to a bus interface system, and more particularly to a current mode bus interface system that transmits/receives data currents.

2. Discussion of the Related Art

Generally, to transmit/receive signals between integrated circuits, either a voltage mode transmitting/receiving operation or a current mode transmitting/receiving operation is performed. Since the voltage mode transmitting/receiving operation introduces a resistive-capacitive delay when transmitting/receiving signals, the current mode transmitting/receiving operation has been studied to reduce the resistive-capacitive delay.

In the current mode transmitting/receiving operation, a current of a transmitted/received signal is observed. In particular, the current mode transmitting/receiving operation maintains a voltage level of a transmission line at a predetermined level, and transfers data by changing a level of a current flowing through the transmission line. For example, a transmitter may sequentially transfer digital data using two logic levels '1' and '0'. Thus, a current level of about 17 mA through 23 mA may be set to the logic level '1', and a current level of about 0 mA through 6 mA may be set to the logic level '0'. A receiver may then recover the transmitted digital data by determining the current level of the transmitted signals. Since the voltage level is maintained at the predetermined level during the current mode transmitting/receiving operation, a resistive-capacitive delay may be reduced.

In a 'pseudo-differential current mode' transmitting/receiving operation, the transmitter may transmit a reference current with a data current. For example, the transmitter may set the current level of about 17 mA through 23 mA to the logic level '1', set the current level of about 0 mA through 6 mA to the logic level '0', and transmit the data current based on the set logic levels. At the same time, the transmitter may transmit a reference current of about 10 mA. The receiver receives both the data current and the reference current, compares a magnitude of the data current with that of the reference current, and then determines the logic level of the transmitted data current. Thus, for example, when the magnitude of the data current is larger than that of the reference current, the transmitted digital data is the logic level '1', and when the magnitude of the data current is smaller than that of the reference current, the transmitted digital data is the logic level '0'.

In a device embodying a mobile application such as a portable phone, a bus interface can be used to aid in the reduction of power consumption. For example, by causing the bus interface and other components of the device to enter into a suspend mode when they are not being used, the power consumed by the device may be reduced. Accordingly, as various applications and devices such as a mobile phone and a digital camera continue to become integrated, the need to support bidirectional data transfer between a digital camera module and a mobile phone module is increasing. However, because the bus interface is increasingly being used in such devices, the ability to conserve power is lessened. As such, a need exists for a bus interface system that is capable of performing a bidirectional data transfer between a host and a client while reducing power consumption.

SUMMARY OF THE INVENTION

In an embodiment of the present invention, a current mode bus interface system includes: a host interface device configured to transmit a reference current and a clock current, and to transmit a data current during a first transfer mode, and to receive a reverse direction data current and compare the reverse direction data current with the reference current to generate a reverse direction data voltage during a second transfer mode; and a client interface device configured to receive the reference current and the clock current and compare the reference current with the clock current to generate a clock voltage, to receive the data current and compare the data current with the reference current to generate a data voltage during the first transfer mode, and to transmit the reverse direction data current through a conducting wire over which the data current is received during the second transfer mode.

In another embodiment of the present invention, a current mode host interface device includes: a reference current transmitter configured to transmit a reference current; a clock current transmitter configured to transmit a clock current that periodically changes; and a data transmitter/receiver configured to transmit a data current during a forward direction transfer mode, and to receive a reverse direction data current through a conducting wire over which the data current is transmitted and compare the reference current with the reverse direction data current to generate a reverse direction data voltage during a reverse direction transfer mode.

The current mode host interface device may cut off the reference current and cause the clock current and the data current to enter into a suspend mode in response to a sleep request. The current mode host interface device may perform a transition from the suspend mode to a normal operation mode in response to the wake-up request, or when a reception of the reverse direction data current having a predetermined level is sensed. The current mode host interface device may transmit the reference current to the current mode client interface device when the current mode host interface device performs the transition from the suspend mode to the normal operation mode, and may transmit the clock current and the data current after the current mode client interface device performs the transition from the suspend mode to the normal operation mode.

In yet another embodiment of the present invention, a current mode client interface device includes: a clock voltage generator configured to receive a reference current and a clock current that periodically changes and compare the reference current with the clock current to generate a clock voltage; and a data transmitter/receiver configured to receive a data current and compare the reference current with the data current to generate a data voltage during a forward direction transfer mode, and to transmit a reverse direction data current through a conducting wire over which the data current is received during a reverse direction transfer mode.

The current mode client interface device may further include a mode control signal generator configured to sense the reference current to generate a mode control signal.

In another embodiment of the present invention, a method of performing a mode transition in a current mode bus interface system includes: cutting off transmitted currents from a host when the host enters into a suspend mode in response to a sleep request from the host; causing a client to enter into a suspend mode when the client senses the cut-off of the transmitted currents; and causing the host or the client to perform a transition from the suspend mode to a normal operation mode in response to a wake-up request from the host or the client.

The normal operation mode includes a forward direction transfer mode and a reverse direction transfer mode. The transmitted currents may include a reference current, a clock current and a data current, and the client may enter into the suspend mode when the client senses the cut-off of the reference current. Both the host and the client may generate the wake-up request to perform the transition from the suspend mode to the normal operation mode.

In yet another embodiment of the present invention, a mode control signal generator of a current mode bus interface system includes: a received current copier configured to copy a received current to generate a copied received current; a comparing current generator configured to generate a comparing current having a magnitude smaller than a magnitude of the received current; a current comparator configured to compare the copied received current with the comparing current to generate a comparison signal; and a noise cancellation unit configured to cancel a noise component included in the comparison signal to generate a mode control signal.

The received current may be a reference current transmitted from a host of the current mode bus interface system. The comparing current may be generated by using the reference current stored as a digital value.

BRIEF DESCRIPTION OF THE DRAWINGS

The above and other features of the present invention will become more apparent by describing in detail exemplary embodiments thereof with reference to the attached drawings in which like reference numbers refer to like elements throughout.

DESCRIPTION OF EXEMPLARY EMBODIMENTS

Hereinafter, exemplary embodiments of the present invention will be explained in detail with reference to the accompanying drawings. However, specific structural and functional details disclosed herein are merely presented for purposes of describing the exemplary embodiments of the present invention.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
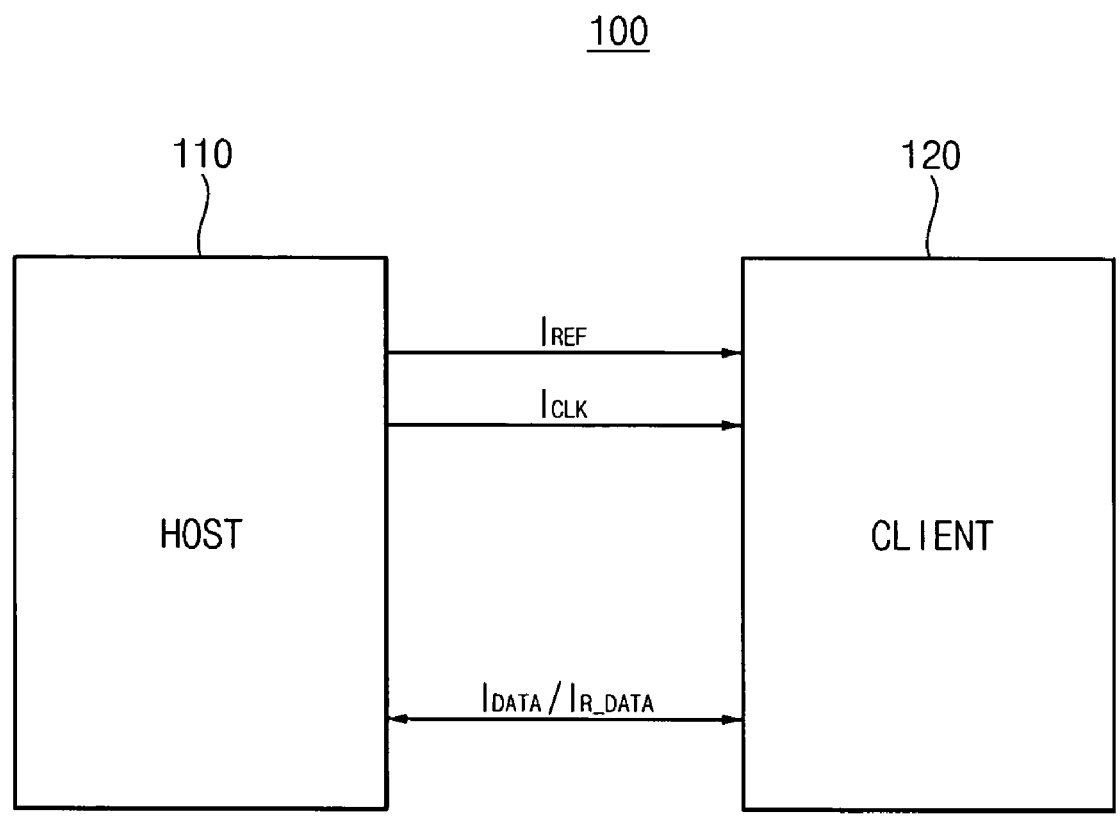
FIG. 1 is a block diagram illustrating a current mode bus interface system according to an exemplary embodiment of the present invention.

FIG. 1 is a block diagram illustrating a current mode bus interface system 100 according to an exemplary embodiment of the present invention.

Referring to FIG. 1, the current mode bus interface system 100 includes a current mode host interface device 110 and a current mode client interface device 120. Hereinafter, the current mode host interface device 110 and the current mode client interface device 120 may be referred to as a host 110 and a client 120, respectively.

The current mode host interface device 110 transmits a reference current $I_{REF}$ and a clock current $I_{CLK}$ to the current mode client interface device 120. The current mode host interface device 110 also transmits a data current $I_{DATA}$ to the current mode client interface device 120 during a forward direction transfer mode. The current mode host interface device 110 receives a reverse direction data current $I_{R\_DATA}$ from the current mode client interface device 120 and compares the reverse direction data current $I_{R\_DATA}$ with the reference current $I_{REF}$ to generate a reverse direction data voltage.

The current mode client interface device 120 receives the reference current $I_{REF}$ and the clock current $I_{CLK}$ from the current mode host interface device 110, and compares the reference current $I_{REF}$ with the clock current $I_{CLK}$ to generate a clock voltage. The current mode client interface device 120 receives the data current $I_{DATA}$ from the current mode host interface device 110 during the forward direction transfer mode, and compares the data current $I_{DATA}$ with the reference current $I_{REF}$ to generate a data voltage. In addition, the current mode client interface device 120 transmits the reverse direction data current $I_{R\_DATA}$ to the current mode host interface device 110 through a conducting wire over which the data current $I_{DATA}$ is received during a reverse direction transfer mode.

As shown, for example, in FIG. 1, when the clock current $I_{CLK}$, the data current $I_{DATA}$ and the reverse direction data current $I_{R\_DATA}$ have a current level of about 300 µA they may be set to a logic 'high' level, and when other currents have a current level of about 100 µA they may be set to a logic 'low' level. The reference current $I_{REF}$ may have a current level of about 200 µA and since the amount of data transferred from the client 120 to the host 110 is typically smaller than that transferred from the host 110 to the client 120 the reverse direction data current $I_{R\_DATA}$ may have a frequency lower than that of the data current $I_{DATA}$.

Figure 2:
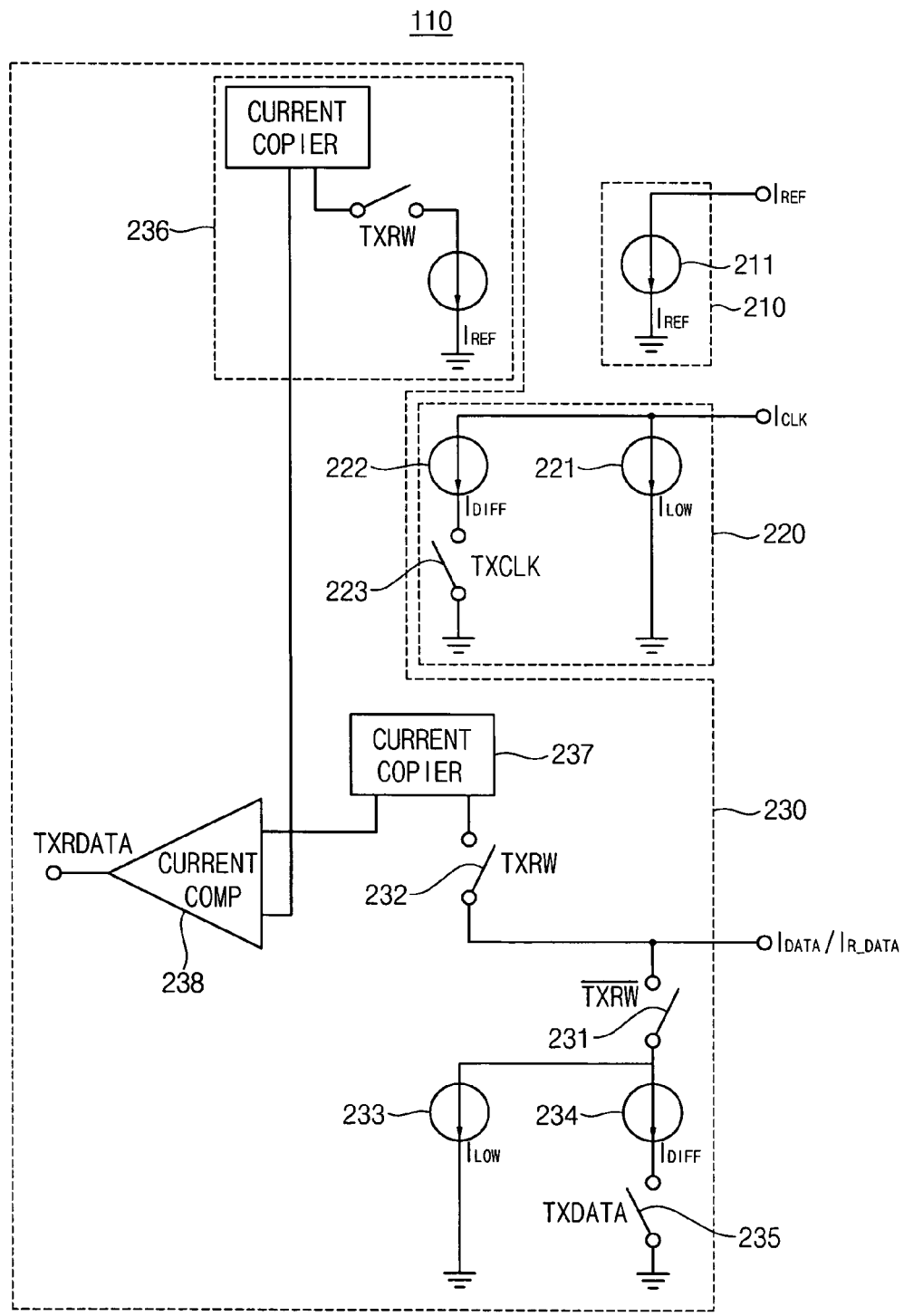
FIG. 2 is a block diagram illustrating a current mode host interface device shown in FIG. 1.

FIG. 2 is a block diagram illustrating the current mode host interface device 110 shown in FIG. 1.

Referring to FIG. 2, the current mode host interface device 110 includes a reference current transmitter 210, a clock current transmitter 220 and a data transmitter/receiver 230.

The reference current transmitter 210 transmits the reference current $I_{REF}$. The reference current transmitter 210 includes a current source 211 for generating the reference current $I_{REF}$.

The reference current $I_{REF}$ generated by the current source 211 may flow to the host 110 from the client 120, or to the client 120 from the host 110.

The clock current transmitter 220 transmits the clock current $I_{CLK}$. The clock current transmitter 220 includes a low current source 221, a differential current source 222 and a clock control switch 223.

The low current source 221 provides a low current $I_{LOW}$ having half a magnitude of the reference current $I_{REF}$. The differential current source 222 provides a differential current $I_{DIFF}$ substantially identical to the magnitude of the reference current $I_{REF}$.

The clock control switch 223 transmits the clock current $I_{CLK}$, identical to a magnitude of the low current $I_{LOW}$ or identical to a magnitude of a sum of the low current $I_{LOW}$ and the differential current $I_{DIFF}$, based on a clock control signal TXCLK.

For example, the reference current $I_{REF}$ and the differential current $I_{DIFF}$ may have a current level of about 200 µA, respectively. The low current $I_{LOW}$ may have a current level of about 100 µA. Consequently, the clock current $I_{CLK}$ may have a current level of about 100 µA or 300 µA.

The data transmitter/receiver 230 transmits the data current $I_{DATA}$ during the forward direction transfer mode, and receives the reverse direction data current $I_{R\_DATA}$ during the reverse direction transfer mode and compares the reference current $I_{REF}$ with the reverse direction data current $I_{R\_DATA}$ to generate a reverse direction data voltage TXRDATA.

The data transmitter/receiver 230 includes switches 231 and 232, a data current transmitter and a data current receiver.

The switch 231 is closed during the forward direction transfer mode, and is opened during the reverse direction transfer mode.

Contrary to the switch 231, the switch 232 is closed during the reverse direction transfer mode, and is opened during the forward direction transfer mode.

The data current transmitter transmits the data current $I_{DATA}$ via the switch 231 during the forward direction transfer mode.

The data current transmitter includes a low current source 233, a differential current source 234 and a data control switch 235.

The low current source 233 provides a low current $I_{LOW}$ having half the magnitude of the reference current $I_{REF}$.

The differential current source 234 provides a differential current $I_{DIFF}$ substantially identical to the magnitude of the reference current $I_{REF}$.

The data control switch 235 transmits the data current $I_{DATA}$, identical to a magnitude of the low current $I_{LOW}$ or identical to a magnitude of a sum of the low current $I_{LOW}$ and the differential current $I_{DIFF}$, based on a data control signal TXDATA.

For example, the reference current $I_{REF}$ and the differential current $I_{DIFF}$ may have a current level of about 200 µA, respectively. The low current $I_{LOW}$ may have a current level of about 100 µA. Consequently, the data current $I_{DATA}$ may have a current level of about 100 µA or 300 µA.

The data current receiver receives the reverse direction data current $I_{R\_DATA}$ via the switch 232 during the reverse direction transfer mode and then generates the reverse direction data voltage TXRDATA.

The data current receiver includes a reference current copier 236, a data current copier 237 and a current comparator 238.

The reference current copier 236 copies the reference current $I_{REF}$ to generate a copied reference current $I_{REF}$.

The data current copier 237 copies the reverse direction data current $I_{R\_DATA}$ to generate a copied reverse direction data current $I_{R\_DATA}$.

The reference current copier 236 and the data current copier 237 may be implemented by using a current mirror.

The current comparator 238 compares the copied reference current $I_{REF}$ with the copied reverse direction data current $I_{R\_DATA}$ to generate the reverse direction data voltage TXRDATA.

The current comparator 238 may be implemented by using various methods known to one of ordinary skill in the art. For example, the current comparator 238 may be an operational amplifier.

As shown in FIG. 2, the current mode host interface device 110 may cut off the reference current $I_{REF}$, the clock current $I_{CLK}$ and the data current $I_{DATA}$ to enter into a suspend mode in response to a sleep request. When the current mode host interface device 110 is in the suspend mode it may perform a transition from the suspend mode to a normal operation mode when a wake-up request occurs or when the reverse direction data current $I_{R\_DATA}$ having a predetermined current level is detected.

When the current mode host interface device 110 performs the transition from the suspend mode to the normal operation mode, the current mode host interface device 110 transmits the reference current $I_{REF}$ to the current mode client interface device 120, and then, transmits the clock current $I_{CLK}$ and the data current $I_{DATA}$ after the current mode client interface device 120 completes the transition from the suspend mode to the normal operation mode.

Figure 3:
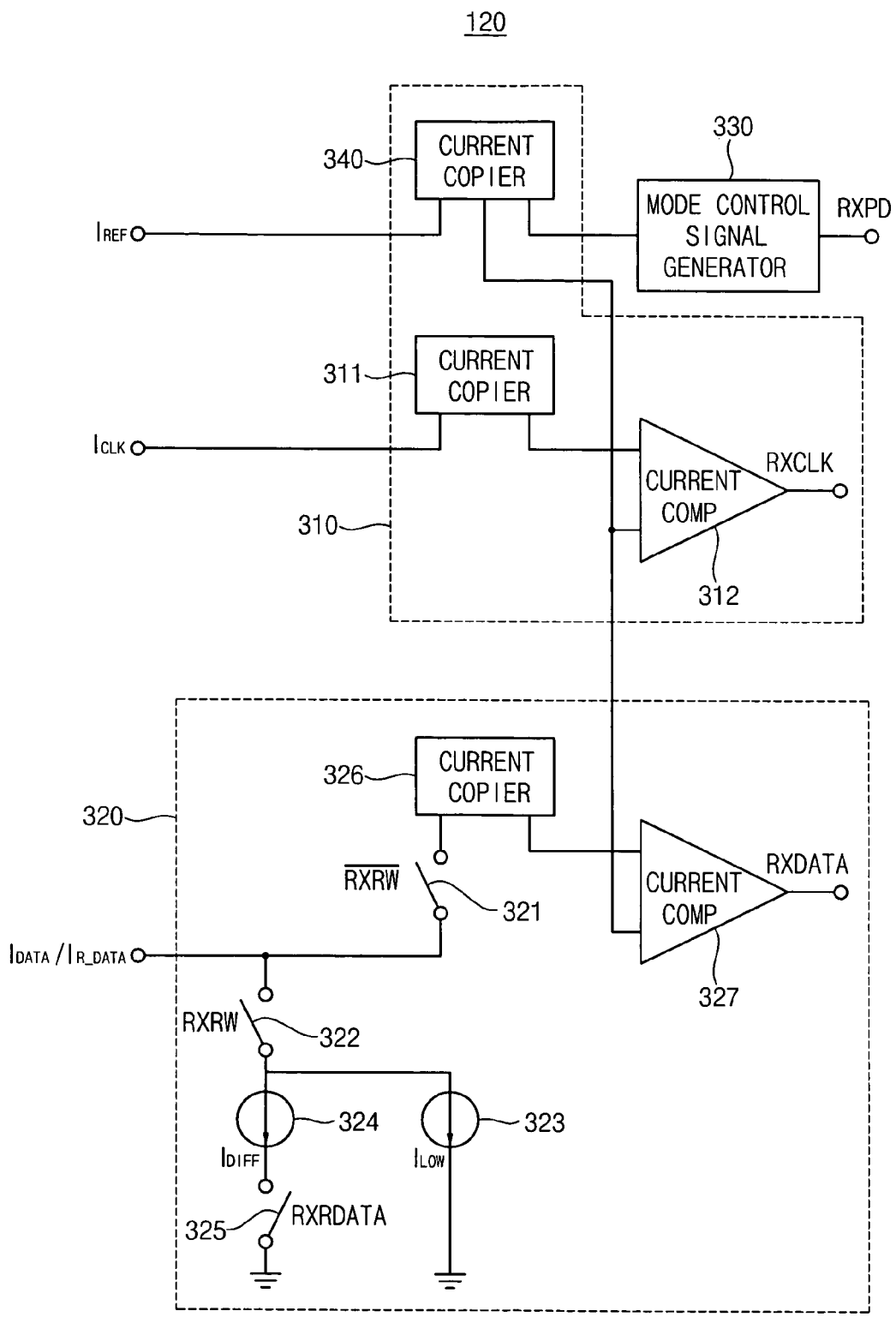
FIG. 3 is a block diagram illustrating a current mode client interface device shown in FIG. 1.

FIG. 3 is a block diagram illustrating the current mode client interface device 120 shown in FIG. 1.

Referring to FIG. 3, the current mode client interface device 120 includes a clock voltage generator 310 and a data transmitter/receiver 320. The current mode client interface device 120 may further include a mode control signal generator 330.

The clock voltage generator 310 receives the reference current $I_{REF}$ and the clock current $I_{CLK}$, which may change periodically, and compares the reference current $I_{REF}$ with the clock current $I_{CLK}$ to generate a clock voltage RXCLK.

The clock voltage generator 310 includes a reference current copier 340, a clock current copier 311 and a current comparator 312.

The reference current copier 340 copies the reference current $I_{REF}$ to generate a copied reference current $I_{REF}$.

The reference current copier 340 may be implemented by using a current mirror, and may provide the copied reference current $I_{REF}$ to the current comparator 312, the data transmitter/receiver 320 and the mode control signal generator 330.

The clock current copier 311 copies the clock current $I_{CLK}$ to generate a copied clock current $I_{CLK}$, and may be implemented by using a current mirror.

The current comparator 312 compares the copied reference current $I_{REF}$ with the copied clock current $I_{CLK}$ to generate the clock voltage RXCLK.

The data transmitter/receiver 320 receives the data current $I_{DATA}$ during the forward direction transfer mode and compares the reference current $I_{REF}$ with the data current $I_{DATA}$ to generate a data voltage RXDATA.

The data transmitter/receiver 320 transmits the reverse direction data current $I_{R\_DATA}$ through a conducting wire over which the data current $I_{DATA}$ is received during the reverse direction transfer mode.

The data transmitter/receiver 320 includes switches 321 and 322, a data current transmitter and a data current receiver.

The switch 321 is closed during the forward direction transfer mode, and is opened during the reverse direction transfer mode.

Contrary to the switch 321, the switch 322 is closed during the reverse direction transfer mode, and is opened during the forward direction transfer mode.

The data current transmitter transmits the reverse direction data current $I_{R\_DATA}$ via the switch 322 during the reverse direction transfer mode.

The data current transmitter includes a low current source 323, a differential current source 324 and a data control switch 325.

The low current source 323 provides a low current $I_{LOW}$ having half a magnitude of the reference current $I_{REF}$.

The differential current source 324 provides a differential current $I_{DIFF}$ substantially identical to the magnitude of the reference current $I_{REF}$.

The low current source 323 and the differential current source 324 may be generated by using the reference current $I_{REF}$ stored as a digital value to prevent a mismatch between a current quantity provided from the current mode client interface device 120 and a current quantity being considered by the current mode host interface device 110.

For example, due to temperature variations, manufacturing process variations and supply voltage variations, the current mode host interface device 110 may not be able to distinguish data included in the reverse direction data current $I_{R\_DATA}$ received from the current mode client interface device 120 by using the reference current $I_{REF}$. To prevent this, the low current source 323 and the differential current source 324 may be generated by using the reference current $I_{REF}$ stored as a digital value. In particular, when the reference current $I_{REF}$ is stored as the digital value, an unnecessary current flow may be prevented.

Still referring to FIG. 3, the data control switch 325 transmits the reverse direction data current $I_{R\_DATA}$, identical to a magnitude of the low current $I_{LOW}$ or identical to a magnitude of a sum of the low current $I_{LOW}$ and the differential current $I_{DIFF}$, based on a reverse direction data control signal RXR-DATA.

For example, the reference current $I_{REF}$ and the differential current $I_{DIFF}$ may have a current level of about 200 μA, respectively. The low current $I_{LOW}$ may have a current level of about 100 μA. Consequently, the reverse direction data current $I_{R\_DATA}$ may have a current level of about 100 μA or 300 μA.

The data current receiver receives the data current $I_{DATA}$ via the switch 321 during the forward direction transfer mode and then generates the data voltage RXDATA.

The data current receiver includes the reference current copier 340, a data current copier 326 and a current comparator 327.

The reference current copier 340 copies the reference current $I_{REF}$ to generate a copied reference current $I_{REF}$. The data current copier 326 copies the data current $I_{DATA}$ to generate a copied reverse data current $I_{DATA}$.

The reference current copier 340 and the data current copier 326 may be implemented by using a current mirror.

The current comparator 327 compares the copied reference current $I_{REF}$ with the copied data current $I_{DATA}$ to generate the data voltage RXDATA. The current comparator 327 may be implemented by using various methods known to one of ordinary skill in the art. For example, the current comparator 327 may be an operational amplifier.

The mode control signal generator 330 generates a mode control signal RXPD according to whether the reference current $I_{REF}$ is allowed to flow from the host 110 or is cut off by the host 110. For example, the mode control signal generator 330 may change a state of the mode control signal RXPD to a logic 'high' level when the reference current $I_{REF}$ is allowed to flow from the host 110, and may change the state of the mode control signal RXPD to a logic 'low' level when the reference current $I_{REF}$ is cut off by the host 110.

The mode control signal generator 330 of FIG. 3 may be included in the current mode host interface device 110 as well as the current mode client interface device 120. In such a case, the current mode host interface device 110 may detect a current transferred from the current mode client interface device 120 to control its transition between the normal operation mode and the suspend mode.

Figure 4:
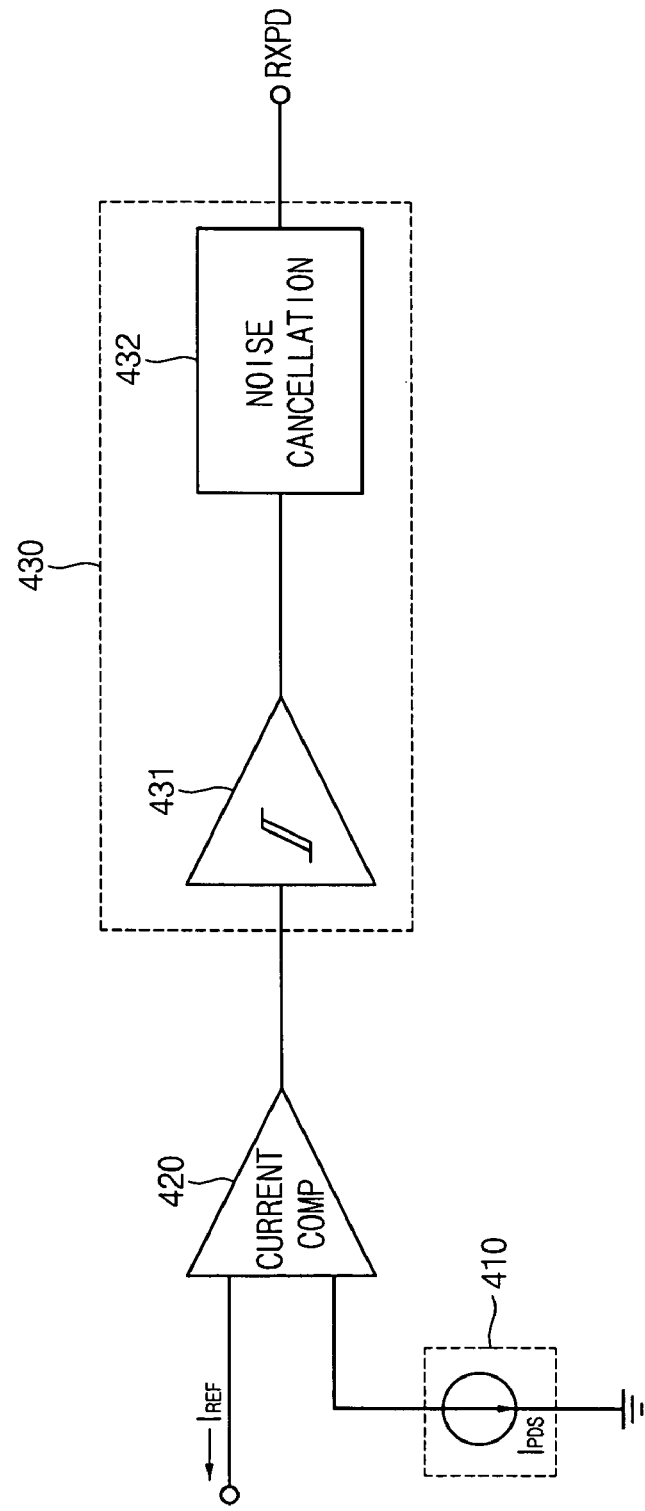
FIG. 4 is a block diagram illustrating a mode control signal generator shown in FIG. 3.

FIG. 4 is a block diagram illustrating the mode control signal generator 330 shown in FIG. 3.

Referring to FIG. 4, the mode control signal generator 330 includes a reference current copier (not shown), a comparing current generator 410, a current comparator 420, and a noise cancellation unit 430.

The reference current copier copies the reference current $I_{REF}$ to generate a copied reference current $I_{REF}$. Although not shown, the reference current copier may be implemented by using a current mirror, and may be included in or the same as the reference current copier 340 shown in FIG. 3.

The comparing current generator 410 generates a comparing current $I_{PDS}$ having a magnitude smaller than the reference current $I_{REF}$.

When the magnitude of the comparing current $I_{PDS}$ is smaller than the magnitude of the reference current $I_{REF}$, a current consumed during the normal operation mode may be reduced and power consumption may thereby be reduced. However, when the magnitude of the comparing current $I_{PDS}$ is much smaller than the magnitude of the reference current $I_{REF}$, the magnitude of the comparing current $I_{PDS}$ should be determined to be at a level such that a noise characteristic of a comparison signal is not degraded. For example, the level of the comparing current $I_{PDS}$ may be determined by performing a simulation.

The comparing current generator 410 may be implemented by using a diode coupled CMOS transistor, or by using a current mirror.

The comparing current $I_{PDS}$ is generated by using the reference current $I_{REF}$ and may correspond to a predetermined ratio of the reference current $I_{REF}$. For example, the comparing current $I_{PDS}$ may correspond to about 10% of the reference current $I_{REF}$. The comparing current generator 410 may also generate the comparing current $I_{PDS}$ by using the reference current $I_{REF}$ stored as a digital value.

Still referring to FIG. 4, the current comparator 420 compares the copied reference current $I_{REF}$ with the comparing current $I_{PDS}$ to generate the comparison signal. For example, when the reference current $I_{REF}$ is allowed to flow from the host 110, a state of the comparison signal is a logic 'high' level, and when the reference current $I_{REF}$ is cut off by the host 110, the state of the comparison signal is a logic 'low' level.

The current comparator 420 may be implemented by using various methods known to one of ordinary skill in the art. For example, the current comparator 420 may be an operational amplifier.

The comparing current generator 410 allows the comparing current $I_{PDS}$ to flow when the reference current $I_{REF}$ is allowed to flow from the host 110, and does not allow the comparing current $I_{PDS}$ to flow, to reduce power consumption during the suspend mode, when the reference current $I_{REF}$ is cut off by the host 110.

The noise cancellation unit 430 cancels a noise component included in the comparison signal to generate the mode control signal RXPD of the current mode client interface device 120.

The noise cancellation unit 430 is used to cancel noise included in signals transmitted, for example, through a current mode bus interface of the current mode bus interface system 100, thus preventing the current mode bus interface system 100 from operating abnormally.

The mode control signal RXPD may also be used for controlling the transition between the normal operation mode and the suspend mode of the current mode client interface device 120. For example, the current mode client interface device 120 may operate in the normal operation mode when the mode control signal RXPD is at the logic 'high' level, and the current mode client interface device 120 may operate in the suspend mode when the mode control signal RXPD is at the logic 'low' level.

Hereinafter, operations of the mode control signal generator 330 shown in FIG. 4 will be explained.

When the current mode host interface device 110 performs the transition from the normal operation mode to the suspend mode and cuts off the reference current $I_{REF}$, the current comparator 420 senses the cut-off of the reference current $I_{REF}$ by using the comparing current $I_{PDS}$. When the current comparator 420 senses the cut-off of the reference current $I_{REF}$ to generate the comparison signal, the noise cancellation unit 430 cancels the noise component included in the comparison signal to generate the mode control signal RXPD.

Additionally, when the current mode host interface device 110 performs the transition from the suspend mode to the normal operation mode and allows the reference current $I_{REF}$ to flow to the client 120, the current comparator 420 senses the flow of the reference current $I_{REF}$ by using the comparing current $I_{PDS}$ and generates the mode control signal RXPD through the noise cancellation unit 430.

The noise cancellation unit 430 includes a Schmitt trigger circuit 431 and a noise cancellation circuit 432.

The Schmitt trigger circuit 431 cancels the noise component having a voltage level smaller than a predetermined voltage level included in the comparison signal.

The noise cancellation circuit 432 cancels the noise component of a short pulse region included in the comparison signal.

Figure 5A:
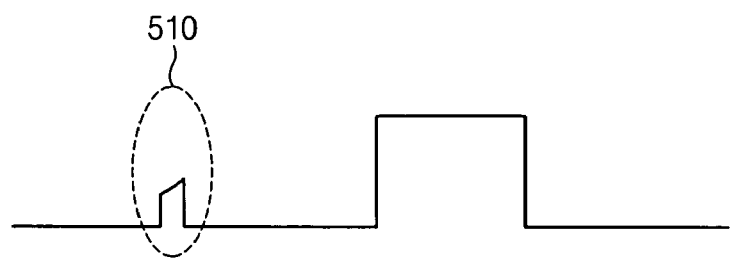
FIG. 5A shows a waveform having a noise component.

FIG. 5A is a waveform diagram illustrating noise cancelled by the Schmitt trigger circuit 431 according to an exemplary embodiment of the present invention.

As shown in FIG. 5A, a noise component 510 having the voltage level smaller than the predetermined voltage level included in the comparison signal is cancelled by the Schmitt trigger circuit 431.

Figure 5B:
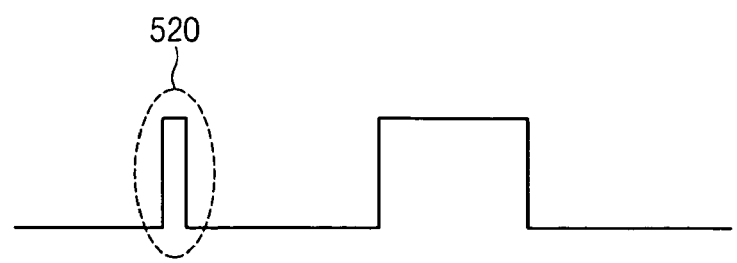
FIG. 5B shows a waveform having a noise component.

FIG. 5B is a waveform diagram illustrating noise cancelled by a noise cancellation circuit 432 according to another exemplary embodiment of the present invention.

As shown in FIG. 5B, a noise component 520 of a short pulse region included in the comparison signal is cancelled by the noise cancellation circuit 432.

Figure 6:
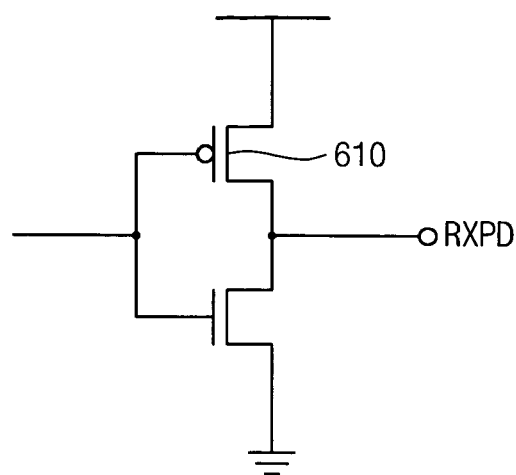
FIG. 6 is a circuit diagram illustrating a noise cancellation circuit shown in FIG. 4 according to an exemplary embodiment of the present invention.

FIG. 6 is a circuit diagram illustrating the noise cancellation circuit 432 shown in FIG. 4 according to an exemplary embodiment of the present invention.

Referring to FIG. 6, the noise cancellation circuit 432 includes a CMOS inverter. The noise cancellation circuit 432 controls an aspect ratio (W/L) of a PMOS transistor 610 constituting the CMOS inverter to cancel a noise component of a short pulse region.

Figure 7:
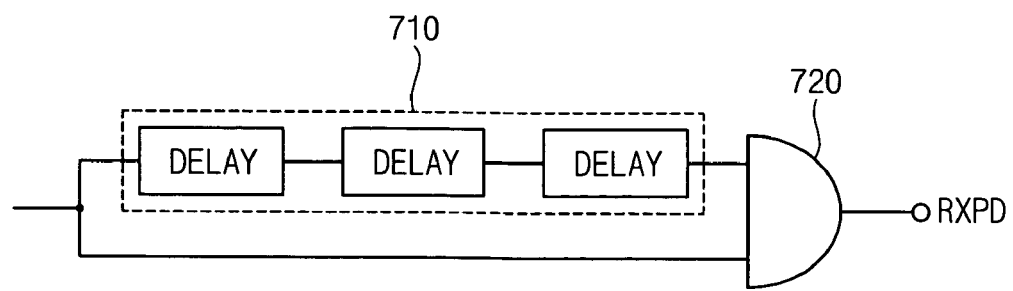
FIG. 7 is a circuit diagram illustrating the noise cancellation circuit shown in FIG. 4 according to another exemplary embodiment of the present invention.

FIG. 7 is a circuit diagram illustrating the noise cancellation circuit 432 shown in FIG. 4 according to another exemplary embodiment of the present invention.

Referring to FIG. 7, the noise cancellation circuit 432 includes a delay section 710 and an AND gate 720.

The delay section 710 delays the comparison signal. The AND gate 720 performs a logical operation on the comparison signal and the comparison signal delayed by the delay section 710 to generate the mode control signal RXPD.

Accordingly, the noise cancellation circuit 432 shown in FIG. 7 may cancel a noise component of a pulse region shorter than a delayed time period of the delay section 710.

Figure 8:
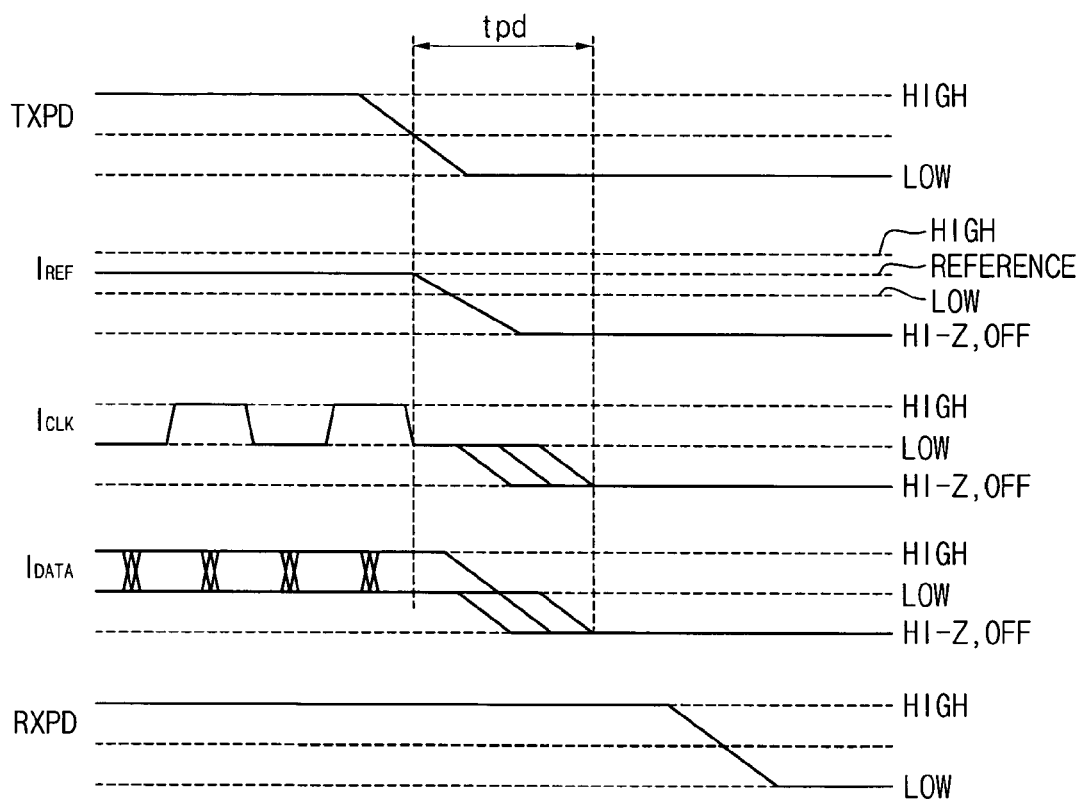
FIG. 8 is a timing diagram illustrating a transition from a normal operation mode to a suspend mode according to an exemplary embodiment of the present invention.

FIG. 8 is a timing diagram illustrating a transition from a normal operation mode to a suspend mode according to an exemplary embodiment of the present invention.

Referring to FIG. 8, a host mode control signal TXPD drops to the logic 'low' level from the logic 'high' level in response to a sleep request from the current mode host interface device 110.

When the host mode control signal TXPD drops to the logic 'low' level, the current mode host interface device 110 cuts off the reference current $I_{REF}$, the clock current $I_{CLK}$ and the data current $I_{DATA}$.

A time period 'tpd' refers to a time during which the host mode control signal TXPD drops to the logic 'low' level from the logic 'high' level, and to a time during which the current mode host interface device 110 cuts off the reference current $I_{REF}$, the clock current $I_{CLK}$ and the data current $I_{DATA}$.

When the reference current $I_{REF}$, the clock current $I_{CLK}$ and the data current $I_{DATA}$ are cut off, the current mode client interface device 120 senses the cut off and drops the client mode control signal RXPD to the logic 'low' level. When the client mode control signal RXPD is at the logic 'low' level, the current mode client interface device 120 enters into the suspend mode and does not consume current.

In other words, the current mode client interface device 120 powers down each module therein to prevent power consumption when the client mode control signal RXPD is at the logic 'low' level. It is to be understood that although the current mode client interface device 120 may sense the cut-off of the reference current $I_{REF}$, the clock current $I_{CLK}$ and the data current $I_{DATA}$ and enter into the suspend mode, the current mode client interface device 120 may sense the cut-off of one of the reference current $I_{REF}$, the clock current $I_{CLK}$ and the data current $I_{DATA}$ and enter into the suspend mode. For example, the current mode client interface device 120 may sense the cut-off of the reference current $I_{REF}$ and enter into the suspend mode.

When the current mode host interface device 110 enters into the suspend mode, each of the modules generating the reference current $I_{REF}$, the clock current $I_{CLK}$ and the data current $I_{DATA}$ enters into a sleep mode and thus power consumption does not occur. At this time, some of the modules may consume power to sense a wake-up signal when it is received from the current mode client interface device 120. For example, when the current mode host interface device 110 is in the suspend mode, the data current receiver may remain activated to sense the reverse direction data current having a predetermined level. In addition, when the current mode host interface device 110 includes the mode control signal generator 330, the mode control signal generator 330 may remain activated to sense the wake-up signal when it is received from the current mode client interface device 120 during the suspend mode.

When the current mode client interface device 120 enters into the suspend mode, the clock voltage generator 310 and the data transmitter/receiver 320 enter into the sleep mode, and thus the clock voltage generator 310 and the data transmitter/receiver 320 do not consume power. At this time, the mode control signal generator 330 included in the current mode client interface device 120 may remain activated to sense the wake-up signal when it is received from the current mode host interface device 110.

Figure 9:
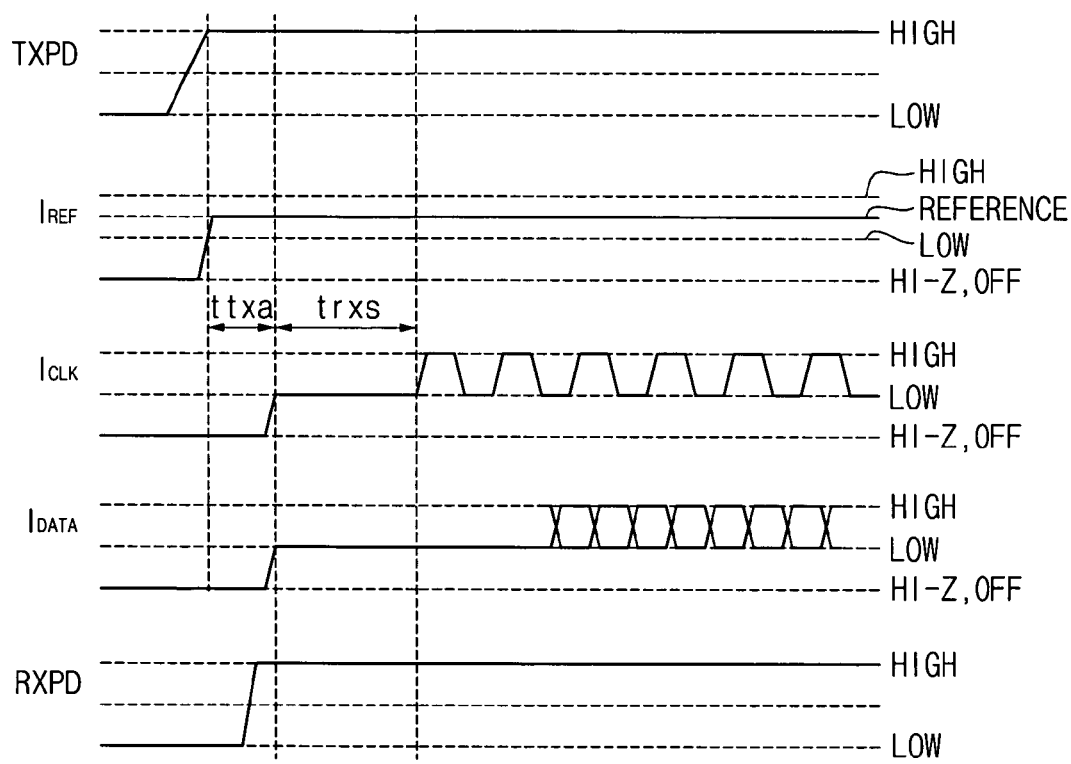
FIGS. 9 through 11 are timing diagrams illustrating transitions from a suspend mode to a normal operation mode according to other exemplary embodiments of the present invention.
Figure 10:
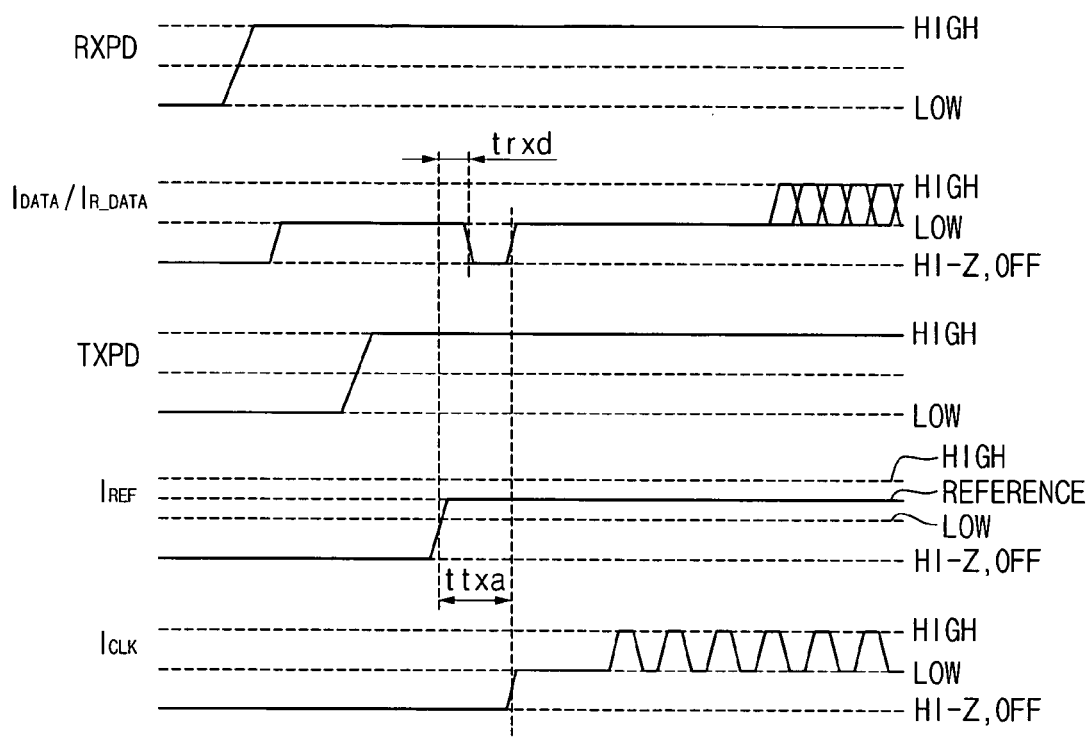
Figure 11:
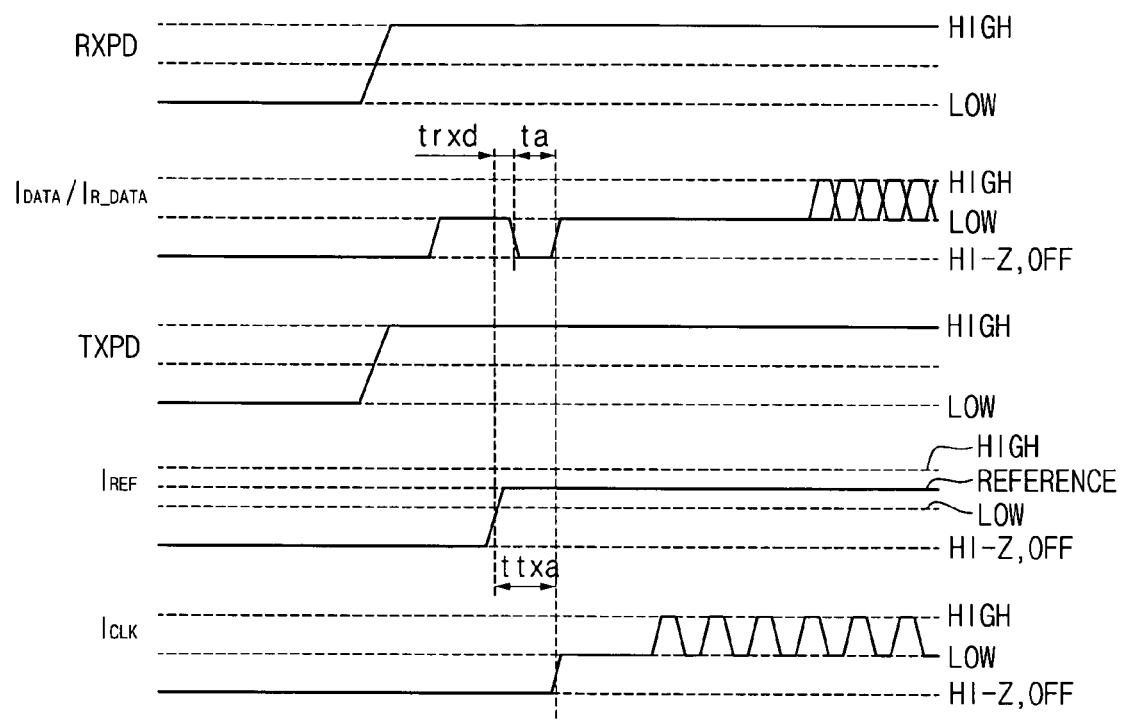

FIGS. 9 through 11 are timing diagrams illustrating transitions from a suspend mode to a normal operation mode according to another exemplary embodiment of the present invention.

In FIGS. 9 through 11, the timing diagrams of the control signals TXPD and RXPD represent a voltage level, and the timing diagrams of the reference current $I_{REF}$, the clock current $I_{CLK}$, the data current $I_{DATA}$ and the reverse direction data current $I_{R\_DATA}$ represent a current level.

FIG. 9 is a timing diagram illustrating a transition from the suspend mode to the normal operation mode of the current mode bus interface system 100 in response to a wake-up request from the current mode host interface device 110.

Referring to FIG. 9, a state of the host mode control signal TXPD is changed from the logic 'low' level to the logic 'high' level in response to a wake-up request from the current mode host interface device 110.

When the state of the host mode control signal TXPD is changed from the logic 'low' level to the logic 'high' level, the current mode host interface device 110 allows the reference current $I_{REF}$ that was cut off to flow to the client 120.

When the reference current $I_{REF}$ is allowed to flow to the client 120, the current mode client interface device 120 senses the reference current $I_{REF}$ to change a state of the client mode control signal RXPD from the logic 'low' level to the logic 'high' level.

When the state of the client mode control signal RXPD is changed from the logic 'low' level to the logic 'high' level, the current mode client interface device 120 activates internal modules that were in the sleep mode and is changed to the normal operation mode.

The current mode host interface device 110 transmits the clock current $I_{CLK}$ and the data current $I_{DATA}$ after the current mode client interface device 120 is changed to the normal operation mode and is then ready to receive currents. In other words, the state of the client mode control signal RXPD is changed to the logic 'high' level from the logic 'low' level within the time period 'ttxa' shown in FIG. 9.

The time period 'ttxa' refers to a time during which the current mode host interface device 110 allows the reference current $I_{REF}$ to again flow to the client 120, and to a time during which the current mode host interface device 110 allows the clock current $I_{CLK}$ and the data current $I_{DATA}$ to again flow to the client 120.

After a time period 'trxs' has begun to elapse, which occurs, for example, immediately after the time period 'ttxa', the waveforms of the clock current $I_{CLK}$ and the data current $I_{DATA}$ are changed.

FIG. 10 is a timing diagram illustrating a transition from the suspend mode to the normal operation mode of the current mode bus interface system 100 in response to a wake-up request from the current mode client interface device 120.

Referring to FIG. 10, the client mode control signal RXPD is changed to the logic 'high' level from the logic 'low' level in response to the wake-up request from the current mode client interface device 120.

When the state of the client mode control signal RXPD is changed to the logic 'high' level from the logic 'low' level, the current mode client interface device 120 allows the reverse direction data current $I_{R\_DATA}$ to flow to the host 110. At this time, the reverse direction data current $I_{R\_DATA}$ may be the logic 'low' level or the logic 'high' level. The reverse direction data current $I_{R\_DATA}$ has a level sensed by the current mode host interface device 110 by using the reference current $I_{REF}$.

When the reverse direction data current $I_{R\_DATA}$ is allowed to flow to the host 110, the current mode host interface device 110 senses the flow of the reverse direction data current $I_{R\_DATA}$ to change the host mode control signal TXPD to the logic 'high' level from the logic 'low' level. The current mode host interface device 110 may sense the reverse direction data current $I_{R\_DATA}$ by using the mode control signal generator 330.

When the state of the host mode control signal TXPD is changed to the logic 'high' level, the current mode host interface device 110 allows the reference current $I_{REF}$ that was cut off to flow to the client 120.

When the flow of the reference current $I_{REF}$ is started, the current mode client interface device 120 senses the reference current $I_{REF}$ and activates internal modules that were in the sleep mode to perform the transition to the normal operation mode. At this time, the current mode client interface device 120 stops to transmit the reverse direction data current $I_{R\_DATA}$ to the host 110, and changes the transfer mode of the data transmitter/receiver 320 to the forward direction transfer mode.

The current mode host interface device 110 transmits the clock current $I_{CLK}$ and the data current $I_{DATA}$ after the current mode client interface device 120 is changed to the forward direction transfer mode and is ready to receive transmitted currents. In other words, the current mode client interface device 120 is changed to the forward direction transfer mode within the time period 'ttxa' shown in FIG. 10.

The time period 'ttxa' refers to a time during which the current mode host interface device 110 allows the reference current $I_{REF}$ that was cut off to again flow to the client 120, and to a time during which the current mode host interface device 110 allows the clock current $I_{CLK}$ and the data current $I_{DATA}$ to again flow to the client 120. A time period 'trxd' refers to a time during which the current mode host interface device 110 allows the reference current $I_{REF}$ that was cut off to again flow to the client 120, and to a time during which the current mode client interface device 120 cuts off the reverse direction data current $I_{R\_DATA}$.

FIG. 11 is a timing diagram illustrating a transition to a normal operation mode of the current mode interface system 100 when the current mode host interface device 110 and the current mode client interface device 120 nearly simultaneously generate a wake-up request.

Referring to FIG. 11, the state of the client mode control signal RXPD is changed to the logic 'high' level from the logic 'low' level in response to the wake-up request, and nearly simultaneously, the state of the host mode control signal TXPD is changed to the logic 'high' level from the logic 'low' level in response to the wake-up request.

Because the state of the host mode control signal TXPD is changed to the logic 'high' level from the logic 'low' level, the current mode host interface device 110 allows the reference current $I_{REF}$ to flow to the client 120, and because the state of the client mode control signal RXPD is changed to the logic 'high' level from the logic 'low' level, the current mode client interface device 120 allows the reverse direction data current $I_{R\_DATA}$ to flow to the host 110.

After the current mode host interface device 110 allows the reference current $I_{REF}$ to flow to the client 120, the current mode host interface device 110 senses the reverse direction data current $I_{R\_DATA}$; however, the current mode host interface device 110 is changed to the forward direction transfer mode since the current mode host interface device 110 allows the reference current $I_{REF}$ to flow to the client 120.

After the current mode client interface device 120 allows the reverse direction data current $I_{R\_DATA}$ to flow to the client 120, the current mode client interface device 120 senses the reference current $I_{REF}$ to activate internal modules that were in the sleep mode, and is changed to the normal operation mode. At this time, the current mode client interface device 120 stops to transmit the reverse direction data current $I_{R\_DATA}$ to the host 110 and changes the transfer mode of the data transmitter/receiver 320 to the forward direction transfer mode.

After the transfer mode of the current mode client interface device 120 is changed to the forward direction transfer mode and the current mode client interface device 120 is ready to receive transmitted currents, the current mode host interface device 110 transmits the clock current $I_{CLK}$ and the data current $I_{DATA}$ to the client 120. In other words, the current mode client interface device 120 is changed to the forward direction transfer mode from the reverse direction transfer mode within a time period 'ttxa' shown in FIG. 11. The time period 'ttxa' refers to a time during which the current mode host interface device 110 allows the reference current $I_{REF}$ that was cut off to again flow to the client 120, and to a time during which the current mode host interface device 110 allows the clock current $I_{CLK}$ and the data current $I_{DATA}$ to again flow to the client 120.

As shown in FIG. 11, a time period 'trxd' refers to a time during which the current mode host interface device 110 allows the reference current $I_{REF}$ that was cut off to again flow to the client 120, and to a time during which the current mode client interface device 120 cuts off the reverse direction data current $I_{R\_DATA}$. A time period 'ta' refers to a time during which the current mode client interface device 120 cuts off the reverse direction data current $I_{R\_DATA}$, and to the time during which the current mode host interface device 110 allows the data current $I_{DATA}$ to again flow to the client 120. The time period 'ttxa' should be longer than a sum of the time period 'trxd' and the time period 'ta'.

As described above, the current mode bus interface system according to an exemplary embodiment of the present invention includes a current mode host interface device and a current mode client interface device and is capable of performing a bidirectional data transfer between the host and the client. For example, the host is capable of transmitting data to the client and receiving data from the client, and the client is capable of transmitting data to the host and receiving data from the host.

Additionally, the method of performing the mode transition and the mode control signal generator according to an exemplary embodiment of the present invention are capable of performing a transition between a normal operation mode and a suspend mode in response to a wake-up request generated by the host or the client.

Therefore, the exemplary embodiments of the present invention may be used with various applications employing bidirectional communication between hosts and clients, and with low-power applications such as mobile applications and devices such as portable camera phones, personal digital assistants, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A current mode bus interface system, comprising:
a host interface device configured to transmit a reference current and a clock current, and to transmit a data current during a first transfer mode, and to receive a reverse direction data current and compare the reverse direction data current with the reference current to generate a reverse direction data voltage during a second transfer mode; and
a client interface device configured to receive the reference current and the clock current and compare the reference current with the clock current to generate a clock voltage, to receive the data current and compare the data current with the reference current to generate a data voltage during the first transfer mode, and to transmit the reverse direction data current through a conducting wire over which the data current is received during the second transfer mode.

2. The current mode bus interface system of claim 1, wherein the host interface device comprises:
a reference current transmitter configured to transmit the reference current;
a clock current transmitter configured to transmit the clock current; and
a data transmitter/receiver configured to transmit the data current during the first transfer mode, and to receive the reverse direction data current and compare the reference current with the reverse direction data current to generate the reverse direction data voltage during the second transfer mode.

3. The current mode bus interface system of claim 2, wherein when the host interface device cuts off the reference current, the clock current and the data current to enter into a suspend mode in response to a sleep request.

4. The current mode bus interface system of claim 3, wherein the host interface device performs a transition from the suspend mode to a normal operation mode in response to a wake-up request or when the reverse direction data current having a predetermined level is sensed.

5. The current mode bus interface system of claim 4, wherein the host interface device transmits the reference current to the client interface device when the host interface device performs the transition from the suspend mode to the normal operation mode, and transmits the clock current and the data current after the client interface device performs the transition from the suspend mode to the normal operation mode.

6. The current mode bus interface system of claim 1, wherein the client interface device comprises:
    a clock voltage generator configured to receive the reference current and the clock current and compare the reference current with the clock current to generate the clock voltage; and
    a data transmitter/receiver configured to receive the data current during the first transfer mode, and to compare the reference current with the data current to generate the data voltage and transmit the reverse direction data current through the conducting wire over which the data current is received during the second transfer mode.

7. The current mode bus interface system of claim 6, wherein the client interface device further comprises:
    a mode control signal generator configured to sense the reference current provided from the host interface device to generate a mode control signal.

8. The current mode bus interface system of claim 7, wherein the mode control signal generator comprises:
    a reference current copier configured to copy the reference current to generate a copied reference current;
    a comparing current generator configured to generate a comparing current that is smaller than the reference current;
    a current comparator configured to compare the copied reference current with the comparing current to generate a comparison signal; and
    a noise cancellation unit configured to cancel a noise component included in the comparison signal to generate the mode control signal.

9. The current mode bus interface system of claim 8, wherein the comparing current is generated by using the reference current stored as a digital value.

10. The current mode bus interface system of claim 9, wherein the comparing current generator allows the comparing current to flow when the reference current is allowed to flow to the client interface device, and cuts off the comparing current when the reference current is not allowed to flow to the client interface device.

11. The current mode bus interface system of claim 10, wherein the client interface device is configured to sense a cut-off of the reference current by using the mode control signal generator, and enters into the suspend mode when the cut-off of the reference current is sensed.

12. The current mode bus interface system of claim 11, wherein the client interface device transmits the reverse direction data current having a predetermined level to the host interface device in response to an internal wake-up request.

13. A current mode host interface device, comprising:
    a reference current transmitter configured to transmit a reference current;
    a clock current transmitter configured to transmit a clock current that periodically changes; and
    a data transmitter/receiver configured to transmit a data current during a forward direction transfer mode, and to receive a reverse direction data current through a conducting wire over which the data current is transmitted and compare the reference current with the reverse direction data current to generate a reverse direction data voltage during a reverse direction transfer mode.

14. The current mode host interface device of claim 13, wherein the clock current transmitter comprises:
    a low current source configured to provide a low current having half a magnitude of the reference current;
    a differential current source configured to provide a differential current substantially identical to the magnitude of the reference current; and
    a clock control switch configured to transmit the clock current identical to the magnitude of the low current or identical to a magnitude of a sum of the low current and the differential current.

15. The current mode host interface device of claim 13, wherein the data transmitter/receiver comprises:
    a first switch configured to be closed during the forward direction transfer mode and opened during the reverse direction transfer mode;
    a second switch configured to be opened during the forward direction transfer mode and closed during the reverse direction transfer mode;
    a data current transmitter configured to transmit the data current through the first switch during the forward direction transfer mode; and
    a data current receiver configured to receive the reverse direction data current through the second switch during the reverse direction transfer mode, and to generate the reverse direction data voltage.

16. The current mode host interface device of claim 15, wherein the data current transmitter comprises:
    a low current source configured to provide a low current having about half a magnitude of the reference current;
    a differential current source configured to provide a differential current substantially identical to the magnitude of the reference current; and
    a data control switch configured to transmit the data current identical to the magnitude of the low current or identical to a magnitude of a sum of the low current and the differential current in response to a data control signal.

17. The current mode host interface device of claim 16, wherein the data current receiver comprises:
    a reference current copier configured to copy the reference current to generate a copied reference current;
    a reverse direction data current copier configured to copy the reverse direction data current to generate a copied reverse direction data current; and
    a current comparator configured to compare the copied reference current with the copied reverse direction data current to generate the reverse direction data voltage.

18. A current mode client interface device, comprising:
    a clock voltage generator configured to receive a reference current and a clock current that periodically changes and compare the reference current with the clock current to generate a clock voltage; and
    a data transmitter/receiver configured to receive a data current and compare the reference current with the data current to generate a data voltage during a forward direction transfer mode, and to transmit a reverse direction data current through a conducting wire over which the data current is received during a reverse direction transfer mode.

19. The current mode client interface device of claim 18, further comprising:
    a mode control signal generator configured to sense the reference current to generate a mode control signal.

20. The current mode client interface device of claim 18, wherein the clock voltage generator comprises:
    a reference current copier configured to copy the reference current to generate a copied reference current;

a clock current copier configured to copy the clock current to generate a copied clock current; and a current comparator configured to compare the copied reference current with the copied clock current to generate the clock voltage.

21. The current mode client interface device of claim 18, wherein the data transmitter/receiver comprises:
   a first switch configured to be closed during the forward direction transfer mode, and opened during the reverse direction transfer mode;
   a second switch configured to be opened during the forward direction transfer mode, and closed during the reverse direction transfer mode;
   a data current receiver configured to receive the data current through the first switch and compare the data current with the reference current to generate the data voltage during the forward direction transfer mode; and
   a data current transmitter configured to transmit the reverse direction data current through the second switch during the reverse direction transfer mode.

22. The current mode client interface device of claim 21, wherein the data current receiver comprises:
   a reference current copier configured to copy the reference current to generate a copied reference current;
   a data current copier configured to copy the data current to generate a copied data current; and
   a current comparator configured to compare the copied reference current with the copied data current to generate the data voltage.

23. The current mode client interface device of claim 22, wherein the data current transmitter comprises:
   a low current source configured to provide a low current having about half a magnitude of the reference current;
   a differential current source configured to provide a differential current substantially identical to the magnitude of the reference current; and
   a data control switch configured to transmit the reverse direction data current identical to the magnitude of the low current or identical to a magnitude of a sum of the low current and the differential current in response to a reverse direction data control signal.

24. The current mode client interface device of claim 23, wherein the current mode client interface device stores the reference current as a digital value, and generates the low current and the differential current by using the reference current stored as the digital value.

* * * * *